(No Model.)
H. L. STONE.
NUT LOCK.
No. 469,924. Patented Mar. 1, 1892.
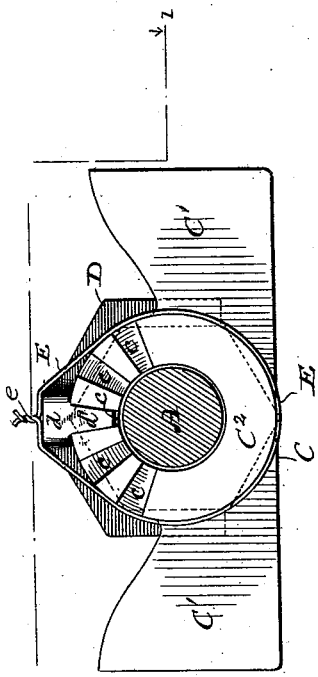
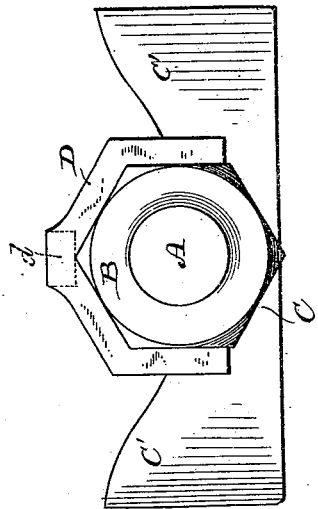
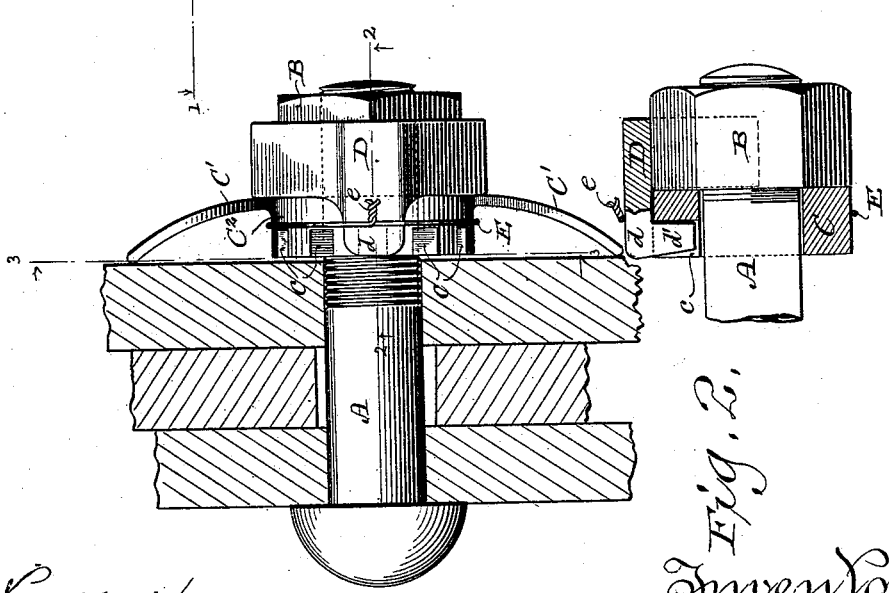
Witnesses
Geo. W. Young
Inventor
Hollis L. Stone,
By H.G. Underwood
Attorneys

UNITED STATES PATENT OFFICE.

HOLLIS L. STONE, OF DELAVAN, WISCONSIN.

NUT-LOCK.

SPECIFICATION forming part of Letters Patent No. 469,924, dated March 1, 1892.

Application filed May 15, 1891. Serial No. 392,854. (No model.)

*To all whom it may concern:*

Be it known that I, HOLLIS L. STONE, a citizen of the United States, and a resident of Delavan, in the county of Walworth, and in the State of Wisconsin, have invented certain new and useful Improvements in Nut-Locks; and I do hereby declare that the following is a full, clear, and exact description thereof.

My invention relates to improvements in nut-locks; and it consists in the matters hereinafter described, and pointed out in the appended claims.

In the accompanying drawings, illustrating my invention, Figure 1 is a plan view, partly in section, illustrating my improved lock-nut as applied to a rail-joint. Fig. 2 is a detail view, partly in section, taken on line 2 2 of Fig. 1. Fig. 3 is a section on line 3 3 of Fig. 1. Fig. 4 is an elevation of my improved lock-nut.

In said drawings, A represents the bolt; B, the nut screw-threaded upon the end of the said bolt, and C a plate located upon the bolt and designed to go between the nut and the fish-plate of a rail-joint. The plate C is provided with spring-arms $C'$ $C'$, arranged to bear against the fish-plate, so as to crowd said plate strongly against the inner face of the nut. An annular projection $C^2$ is provided upon the inner surface of the plate C, and in the periphery of said annular projection are formed a number of radial slots $c$ $c$, said slots being preferably of a slightly-tapered form, as shown in Fig. 3 of the drawings.

D represents a yoke shaped so as to fit closely upon the outside of the nut B, said yoke being provided with an inwardly-extending arm $d$, upon the under side of which is provided a lug $d'$, adapted for engagement with one of the radial slots in the periphery of the annular projection $C^2$. A wire E is passed around the annular projection and over the arm $d$ upon the yoke D, being twisted together at $e$, so as to secure the yoke in position upon the plate C.

The operation of my improved nut-lock is as follows: The bolt having been inserted within the bolt-holes, the plate C is slipped upon the threaded end of the bolt, with the annular projection $C^2$ upon the inner side, as in Fig. 1 of the drawings. The nut is then screwed upon the outer end of the bolt, thus crowding the plate D inwardly and compressing the elastic arms $C'$ $C'$. If desired, the nut may be turned down until the annular projection $C^2$ is pressed firmly against the surface of the fish-plate, the further tightening of the nut upon the bolt being thereby prevented. In this condition the parts will be very tightly drawn together, and the outward pressure exerted by the spring-arms $C'$ $C'$ will serve to effectually prevent the nut from turning. In order to insure against any turning of the nut, the yoke D is then placed in position upon the outside of the nut and the lug $d'$ upon the under side of the arm $d$ inserted in one of the radial slots $c$. In this manner the yoke D is firmly locked against rotation by its engagement with the plate C, and the nut is also positively locked against rotation by its engagement with the yoke D. The wire E being then passed around the annular projection $C^2$, and the arm $d$ serves to hold the parts firmly together and to prevent accidental displacement of the yoke. By using for this purpose a comparatively stiff wire, so as to render it necessary to use a tool in order to untwist said wire, the device is rendered practically secure against malicious disarrangement.

By the construction shown and described the plate C, being provided with the elastic arms $C'$ $C'$, will always bear strongly against the inner surface of the nut, so that in case of any wear of the parts said plate will be crowded outwardly against said nut, thus rendering the joint sufficiently tight to prevent any play of the parts.

It will be understood that this form of nut-lock may be employed in connection with any desired form of joint other than that shown and described; but it is particularly adapted for use in connection with railroad-rail joints.

Having thus described my invention, what I claim is—

1. The combination, with a bolt and nut, of a plate adapted to be placed upon the bolt between the nut and the parts to be joined, said plate being provided with laterally-extended spring-arms and with an annular extension upon its inner surface, said annular extension being provided with a plurality of radial slots, and a yoke adapted to fit closely about the outside of the nut, said yoke being provided with an arm having a lug adapted for engagement with one of said slots in said plate, substantially as and for the purpose described.

2. The combination, with a bolt and nut, of a plate adapted to be placed upon the bolt between the nut and the parts to be joined, said plate being provided with laterally-extended spring-arms and with an annular extension upon its inner surface, said annular extension being provided with a plurality of radial slots, a yoke adapted to fit closely about the outside of the nut, said yoke being provided with an arm having a lug adapted for engagement with one of said slots, and a wire passed around the annular projection on said plate and over said arm upon the yoke to unite said parts together, substantially as and for the purpose described.

In testimony that I claim the foregoing I have hereunto set my hand, at Delavan, in the county of Walworth and State of Wisconsin, in the presence of two witnesses.

HOLLIS L. STONE.

Witnesses:
D. B. BARNES,
F. E. LATIMER.